(12) United States Patent
Olofsson et al.

(10) Patent No.: US 7,122,234 B2
(45) Date of Patent: *Oct. 17, 2006

(54) TRANSPARENT PLASTIC GAS BARRIER PACKAGING LAMINATE

(75) Inventors: Torsten Olofsson, Romont (CH); Sven Andrèn, Lund (CH); Monika Bürki, Villars Mendraz (CH)

(73) Assignee: Tetra Laval Holding & Finance S.A., Pully (CH)

( * ) Notice: Subject to any disclaimer, the term of this patent is extended or adjusted under 35 U.S.C. 154(b) by 96 days.

This patent is subject to a terminal disclaimer.

(21) Appl. No.: 10/705,876

(22) Filed: Nov. 13, 2003

(65) Prior Publication Data

US 2004/0142182 A1 Jul. 22, 2004

Related U.S. Application Data

(60) Provisional application No. 60/427,212, filed on Nov. 19, 2002.

(51) Int. Cl.
*B32B 27/32* (2006.01)

(52) U.S. Cl. .............. 428/36.91; 428/34.6; 428/35.2; 428/35.7; 428/336; 428/448; 428/451; 428/480; 428/520

(58) Field of Classification Search ............. 428/36.91, 428/34.6, 35.2, 35.7, 336, 448, 451, 480, 428/520
See application file for complete search history.

(56) References Cited

U.S. PATENT DOCUMENTS

| | | | | |
|---|---|---|---|---|
| 5,591,522 A | * | 1/1997 | Sakai et al. ................. | 428/353 |
| 5,670,224 A | * | 9/1997 | Izu et al. .................... | 428/35.8 |
| 5,705,267 A | * | 1/1998 | Starzewski et al. ......... | 428/336 |
| 5,731,092 A | | 3/1998 | Breant et al. | |
| 6,017,638 A | * | 1/2000 | Breant et al. ............... | 428/448 |
| 6,503,634 B1 | * | 1/2003 | Utz et al. .................... | 428/448 |
| 6,521,312 B1 | * | 2/2003 | Keiser ........................ | 428/41.8 |
| 6,905,769 B1 | * | 6/2005 | Komada ...................... | 428/421 |

FOREIGN PATENT DOCUMENTS

| EP | 0 385 054 | | 9/1990 |
|---|---|---|---|
| EP | 1300240 A1 | * | 4/2003 |
| WO | WO 99/19229 | * | 4/1999 |

OTHER PUBLICATIONS

AZoM, Core Materials in Polymeric Composites [Online] [Retrieved Jun. 22, 2005], Retrieved from the Internet: <http://www.azom.com/details.asp?ArticleID=1092>.*

* cited by examiner

*Primary Examiner*—Rena Dye
*Assistant Examiner*—Sow-Fun Hon
(74) *Attorney, Agent, or Firm*—Buchanan Ingersoll PC

(57) ABSTRACT

The invention relates to a transparent gas barrier packaging laminate having a required bending stiffness, comprising outer layers of heat-sealable polyolefin, two polymer carrier layers each being coated with a SiOx gas barrier layer, wherein the two polymer carrier layers with SiOx layers are laminated to each other by means of an intermediate polymer layer, which in comparison to the other surrounding layers is relatively stiff and thicker. The required stiffness of the packaging laminate is obtained by the I-beam interaction between the two carrier layers and the intermediate distancing polymer layer. Preferably, the thickness of the intermediate polymer layer constitutes from about 30 to about 55% of the total thickness of the packaging laminate. The invention also relates to a packaging container such as a pouch or similar manufactured from the packaging laminate and to a method of manufacturing of the packaging laminate.

17 Claims, 2 Drawing Sheets

TRANSPARENT PLASTIC GAS BARRIER PACKAGING LAMINATE

CROSS-REFERENCE TO RELATED APPLICATIONS

This application claims the benefit under 35 U.S.C. §119 of U.S. Provisional Application No. 60/427,212 entitled "Transparent Plastic Gas Barrier Packaging Laminate" filed in the U.S. on Nov. 19, 2002, the entire content of which is hereby incorporated by reference. This application also claims the benefit of foreign priority under 35 U.S.C. §§ 119 and/or 365 to application SE 0203350-4 filed in Sweden on Nov. 13, 2002, the entire content of which is hereby incorporated by reference.

TECHNICAL FIELD OF THE INVENTION

The present invention relates to a transparent gas barrier packaging laminate having a required bending stiffness, comprising outside layers of heat-sealable olefin polymer, a first gas barrier layer of SiOx, coated onto a first polymer carrier layer and a second gas barrier layer of SiOx, coated onto a second polymer carrier layer. The invention also relates to a method of manufacturing the packaging laminate and to packaging containers produced from the packaging laminate.

BACKGROUND OF THE INVENTION

On the market today, there is an increasing demand for packages for beverage and liquid food of the type that are single-use disposable plastic pouches, preferably at least partly, at some portion of the package, transparent to display the contents to the consumer when exposed on the shelf, e.g. in the food store. Most commonly such packages are provided with a straw for direct drinking or a pull-tab for opening and pouring of the contents. Such packages do not have the advantage of having the dimension and grip stability of the more common paperboard packaging laminate drink packages of the Tetra Brik®-type. However, they have the image of a more positive environmental profile in many countries, with the argument that the amount of used packaging material as well as the volume of the emptied package is very small and because it may be recyclable with other similar flexible plastic items. Furthermore, the traditional Tetra Brik®-type packages have an oxygen barrier layer of aluminium foil, which in some countries is less desirable and which also makes a transparent package impossible.

In the high-speed, continuous packaging processes well known for the paperboard packages of the Tetra Brik®-type, a web of the packaging laminate is continuously formed into a tube, filled with contents and sealed off to pillow-shaped packaging containers by a simultaneous heat sealing and cutting operation. The pillow-shaped packaging container is then normally foldformed into a parallellepipedic packaging container. The main advantage of this continuous tube-forming, filling and sealing packaging process concept is that the web may be sterilized continuously just before tube-forming, thus providing for the possibility of an aseptic packaging process, i.e. a process wherein the liquid content to be filled as well as the packaging material itself are reduced from bacteria and the filled packaging container is produced under clean circumstances such that the filled package may be stored for a long time even at ambient temperature, without the risk of growth of microorganisms in the filled product. An important factor for long-term storage is of course also the gas barrier properties of the filled and sealed packaging container, which in turn is highly dependent on the gas barrier properties of the packaging laminate itself but also on the qualities of the seals and of the opening arrangement of the final package. An other important advantage of the Tetra Brik®-type packaging process is, as stated above, the possibility of continuous high-speed packaging, which has considerable impact on cost efficiency. The pouch-type drink packages available today on the market, are however, typically manufactured by other non-aseptic, more complex and expensive processes of less continuous character.

In the prior art it is also known to apply gas barrier coatings of SiOx onto a substrate by means of plasma enhanced chemical vapour deposition (PECVD). The advantages with a SiOx gas barrier layer compared to other gas barrier materials are firstly that it has a positive environmental profile, secondly, that it is not affected when in contact with surrounding moisture or liquid, it is transparent and since it is applied in very thin layers, also flexible and resistant to cracking when bent or folded.

It is known from EP-A-385054 to laminate two gas barrier layers of a silicon compound, such as silicon dioxide, facing each other, by means of an intermediate binder layer. This document, however, is silent on the stiffness properties of the laminate and does not describe a thicker or stiffer intermediate layer. Moreover, the silicon dioxide ($SiO_2$) layers described are very different from the PECVD-coated layers of SiOx intended according to this invention.

There is thus a need for a thin, transparent, gas-tight, metalfoil-free packaging laminate having suitable properties for an aseptic, continuous highspeed packaging process similar to the Tetra Brik Aseptic® packaging process.

An important factor in such a process is the stiffness and stability of the packaging laminate. If the laminate web is too flexible and easy to displace in the high-speed tube-forming operation, the process will not be able to run safely and continuously. On the other hand, if the packaging laminate is too thick in order to obtain the required stiffness, it may be difficult to manage in the fold-forming operation. Moreover and naturally, the cost-efficiency of the material itself wilt be reduced with increasing thickness. The pouch-type drink packages available today on the market often have a laminated structure including a single gas barrier layer of, for example, an ethylene vinyl alcohol polymer (EVOH), and do not have the requirements on stiffness properties according to the present invention.

It is therefore an object of the present invention to provide a packaging laminate that alleviates the above discussed disadvantages and problems.

It is an object of the present invention to provide a transparent packaging laminate, having gas barrier properties suitable for aseptic packaging and long-term storage, as well as sufficient bending stiffness to be suitable for continuous, high speed packaging of liquid foods by means of a continuous tube-forming process.

It is a further object of the invention to provide a packaging laminate having the required stiffness but being sufficiently thin for foldforming of the package at at least one end of the package.

The invention is also directed to a packaging container filled with beverage or liquid food produced from the packaging laminate of the invention as well as to a method of manufacturing of the laminated packaging material of the invention.

SUMMARY OF THE INVENTION

The solution to the above mentioned problem and need, is thus to provide a thin, transparent packaging laminate with good gas barrier properties by means of laminating the two polymer carrier layer films, coated with the SiOx gas barrier layers, into an I-beam or sandwich arrangement with an intermediate, in comparison to the other, surrounding laminate layers, relatively thick, distancing layer of a high stiffness polyolefin, the laminate further having outer heat sealable layers of thermoplastic polymer.

Preferably, the polymer carrier layers comprise polyester or polyamide materials and therefore have a certain degree of inherent stiffness, however, other relatively stiff polymers may also be employed for the carrier layers according to the invention. More preferably, they are oriented films and thus have a higher degree of crystallinity than non-oriented polymer films. The olefin polymer of the intermediate layer also contributes with a certain degree of stiffness by itself to the packaging laminate as a whole. The so-called I-beam or sandwich arrangement of two relatively stiff carrier layers laminated to each side of a thicker and relatively stiff intermediate polymer layer provides for a laminate having surprisingly good bending stiffness in relation to its thickness. In addition, the arrangement of the two PECVD-deposited SiOx layers has proved to result in a much more than two-fold increased gas barrier, compared to a laminate or film containing merely one SiOx-layer. Thus, the arrangement of a thicker intermediate layer also acting as a buffer" for penetration of gas, in particular oxygen gas, provides for surprisingly improved gas barrier properties, which prove a synergistic effect resulting from this particular arrangement. Thus, the laminate has excellent gas barrier properties and is both economical and easy to handle in a high speed, continuous packaging process.

Preferably, the thickness of the intermediate layer does not constitute more than from about 30 to about 55% of the total thickness of the packaging laminate, more preferably from about 35 to about 50%. Thus, it is clear that the required bending stiffness of the resulting packaging laminate does not result from the mere thickness of the intermediate layer, but that there is some kind of interaction between the layers in the laminate, which we know as the so called I-beam or sandwich effect.

Preferably, the thickness of one carrier layer constitutes from about 5 to about 20%, more preferably from about 5 to about 15% of the total packaging laminate, which shows that also the carrier layers do not contribute to the total bending stiffness of the packaging laminate by their mere thickness, but instead that they do need to contribute by their inherent stiffness properties and their interaction with the thicker intermediate layer.

Preferably, the carrier layer of oriented polymer is a premanufactured film of polyester or polyamide, such as a cast film or preferably a mono- or biaxially oriented polyethyleneterephtalate (PET), polyethylenenaphtenate (PEN) or polyamide (PA). By using premanufactured oriented polymer films as the carrier layers, it is ensured that they have some inherent bending stiffness relative to other layers in the laminate that are extrusion or coextrusion laminated.

Also preferably, the polymer of the intermediate layer is a polyolefin having higher stiffness properties, relative to for example low density polyethylene (LDPE), such as for example high density polyethylene (HDPE) or polypropylene (PP). By using a polyolefin having relatively higher inherent bending stiffness properties in the intermediate layer, an extra contribution, in addition to the I-beam effect, to the packaging laminate as a whole is obtained.

Thus, preferably, the polymer of the intermediate layer is an olefine polymer with higher stiffness than LDPE and the polymer of the carrier layer is an oriented polyester or polyamide.

According to a most preferred embodiment of the invention, the gas barrier layers of SiOx are positioned in the laminate such that they are facing each other, with the intermediate polymer layer between them. In this way, optimal gas barrier layers may be obtained and the layers of SiOx will be protected in the best way. However, also embodiments where one or both of the SiOx layers are facing outwards in the laminate structure are conceivable.

The SiOx layer is preferably deposited by PECVD technique, wherein x=1.7 to 2.0, at a thickness of from about 50 to about 500 Å, preferably from about 80 to about 300 Å. There exist alternative methods of depositing inorganic layers, such as SiOx, onto polymer films, which however, generally result in thicker and less flexible layers of the SiOx. This in turn, due to the formation of cracks in the SiOx layer, generally results in laminates of lower quality with regard to oxygen barrier properties. It is thus preferred according to the invention that the SiOx gas barrier layers are applied by means of the continuous method of plasma enhanced chemical vapour deposition, PECVD, of SiOx from a plasma of an organic silicon compound, such as hexadimethylsiloxane (HDMSO).

Preferably, the thickness of the carrier polymer layer is from about 7 to about 30 μm, more preferably from about 8 to about 20 μm, most preferably from about 8 to about 15 μm, and according to a preferred embodiment, the two carrier polymer films have about the same or exactly the same thickness. It is known that the PECVD process works optimally with the above thickness of the carrier layer, which is also preferred from the economical point of view. In order to ensure a symmetrical and reliable behaviour in the filling and packaging operation, it is best to employ carrier layers, i.e. the outer layers of the I-beam arrangement, that have about the same or exactly the same thickness, although it may be possible for certain desired properties to use carrier layers of different thickness or bending stiffness.

Preferably, the thickness of the intermediate layer is from about 40 to about 80 μm, more preferably from about 40 to about 60 μm, most preferably from about 40 to about 55 μm and preferably, while the total thickness of the packaging laminate is from about 100 to about 180 μm, most preferably from about 110 to about 140 μm.

For the optimal I-beam effect, the thickness of the intermediate layer should be from about 40 to about 60 μm, when the intermediate layer comprises a polymer such as for example HDPE or PP. For other alternative intermediate layer polymers, it may be feasible to use thicker intermediate layers such as up to 80 μm, in particular if the total thickness of the packaging laminate is desired to be from about above 140 to about 180 μm.

Preferably, the thickness of the intermediate layer (15) is from 40 to 60 μm, the thickness of the polymer carrier layer (11,12) is from 8 to 15 μm, the thickness of the outside layers of heat-sealable olefin polymer (16,17) is from 10 to 25 μm and from 18 to 30 μm, respectively, and the total thickness of the packaging laminate is from 110–140 μm.

More preferably, the thickness of the intermediate layer (15) is from 40 to 50 μm, the thickness of the polymer carrier layer (11,12) is from 12 to 15 μm, the thickness of the outside layers of heat-sealable olefin polymer (16,17) is from 10 to 25 μm and from 18 to 30 μm, respectively, and the total thickness of the packaging laminate is from 110–140 μm.

Alternatively, the thickness of the intermediate layer (15) is from 50 to 60 μm, the thickness of the polymer carrier layer (11,12) is from 8 to 12 μm, the thickness of the outside layers of heat-sealable olefin polymer (16,17) is from 10 to 25 μm and from 18–30 μm, respectively, and the total thickness of the packaging laminate is from 110–140 μm.

Preferably, for an optimal bending stiffness resulting from the I-beam arrangement, the ratio between the thickness of the intermediate layer and the carrier layer is from 2 to 7 and the ratio of the total thickness of the packaging laminate to the thickness of the intermediate layer is from 2 to 3 when the total thickness is from 110 to 140 μm, or, the ratio between the thickness of the intermediate layer and the carrier layer is from 4 to 10 and the ratio of the total thickness of the packaging laminate to the thickness of the intermediate layer is from 1.7 to 3 when the total thickness is from 140 to 180 μm.

According to another aspect, there is provided a packaging container filled with beverage or liquid food, preferably an aseptic packaging container, produced at least partly from the packaging laminate described herein.

The packaging container according to the invention is a pouch or "stand-up pouch or similar and is durable at handling and distribution and resistant to moisture and oxygen gas during long term storage, due to the high quality packaging laminate, which in turn also provides for high seal quality and excellent gas barrier properties. A further important advantage of packaging containers produced from the packaging laminate according to the invention is that they are durable to microwave cooking or thawing, as well as retorting.

According to a further aspect, there is provided a method of manufacturing of the laminated packaging material of the invention. One method of manufacturing of a packaging laminate comprises the steps of advancing a first web comprising a first polymer carrier layer coated with a first SiOx gas barrier layer and a second web comprising a second polymer carrier layer coated with a second SiOx gas barrier layer towards each other and towards an extrusion station, laminating the two webs to each other by means of extruding an intermediate polymer layer, optionally together with a binder layer on each side of the intermediate polymer layer, between the two webs arid and pressing them together at the extrusion station, extruding a first outside layer comprising a heat-sealable polyolefin onto the outside of the first or second polymer carrier layer at an extrusion station and extruding a second opposite outside layer comprising a heat-sealable polyolefin onto the outside of the other of the second or first polymer carrier layer at an extrusion station. Another method of manufacturing of a packaging laminate comprises the steps of advancing a first web comprising a first polymer carrier layer coated with a first SiOx gas barrier layer and a second web comprising a second polymer carrier layer coated with a second SiOx gas barrier layer towards each other and towards an extrusion station, laminating the two webs to each other by means of extruding an intermediate polymer layer, optionally together with a binder layer on each side of the intermediate polymer layer, between the two webs and pressing them together at the extrusion station, laminating by application of heat and pressure a premanufactured film comprising at least one layer of a heat-sealable polyolefin to the outside of the first or second polymer carrier layer at a hot roller nip and laminating by application of heat and pressure a premanufactured film comprising at least one layer of a heat-sealable polyolefin to the outside of the other of the second or first polymer carrier layer at a hot roller nip. A further method of manufacturing of a packaging laminate comprises the steps of advancing a first web comprising a first polymer carrier layer coated with a first SiOx gas barrier layer and a second web comprising a second polymer carrier layer coated with a second SiOx gas barrier layer towards each other and towards a hot roller nip, laminating the two webs to an intermediate pre-manufactured web comprising an intermediate polymer layer and, optionally, a binder layer on each side of the intermediate polymer layer, which is advanced between the first and second webs, and applying heat and pressure in the hot roller nip, laminating by application of heat and pressure a pre-manufactured film comprising at least one layer of a heat-sealable polyolefin to the outside of the first or second polymer carrier layer at a hot roller nip and laminating by application of heat and pressure a premanufactured film comprising at least one layer of a heat-sealable polyolefin to the outside of the other of the second or first polymer carrier layer at a hot roller nip.

DESCRIPTION OF FIGURES

Further advantages and favourable characterising features of the present invention will be apparent from the following detailed description, with reference to the appended figures, in which.

DETAILED DESCRIPTION OF THE INVENTION

Figure 1:
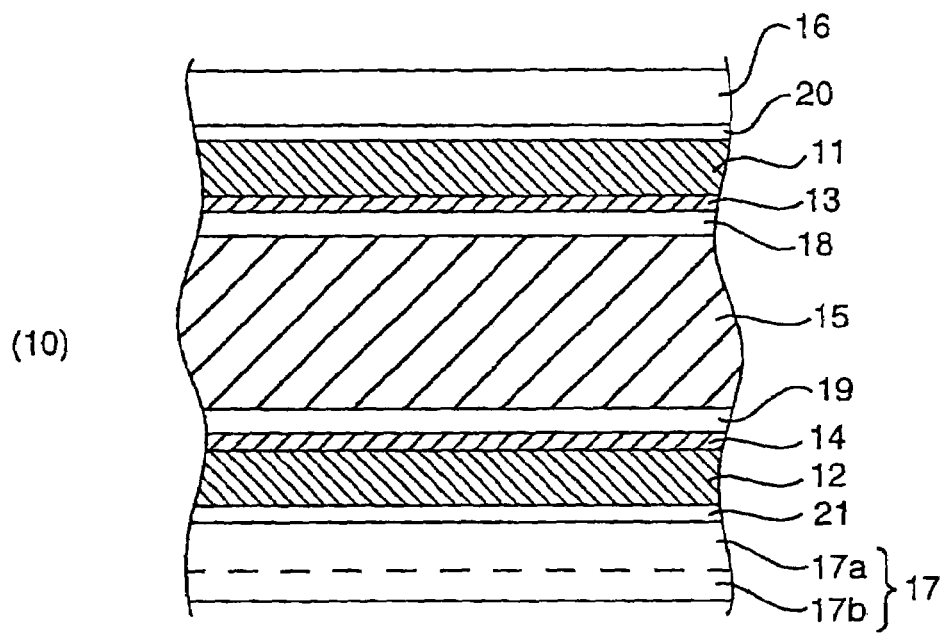
FIG. 1 is a cross-sectional view of a preferred laminated packaging material according to the present invention.

FIG. 1 thus shows a transparent packaging laminate 10, comprising a first and second carrier layer 11;12 being a film of a preferably oriented polyester, such as for example polyethyleneterephtalate (PET), or a film of a preferably oriented polyamide (PA), onto which are coated thin gas barrier layers of SiOx 13;14 by means of plasma enhanced chemical vapour deposition (PECVD). The two SiOx layers are preferably directed towards the interior of the laminate, thus facing each other. Between the two carrier layers coated with gas barrier layers, is laminated an intermediate layer 15 of a relatively stiff olefin polymer, such as for example high density polyethylene (HDPE) or polypropylene (PP). The intermediate layer is thicker than any of the surrounding layers in the packaging laminate, and provides as such a distancing element between the two carrier layer films of oriented polymer. The preferred oriented polymer films have a certain degree of Inherent stiffness in that they are oriented and thus may have a relatively higher degree of crystallinity than non-oriented polymer films. The olefin polymer of the intermediate layer also contributes with a certain degree of stiffness by itself to the packaging laminate as a whole. The so-called I-beam or sandwich arrangement of two relatively stiff carrier layers laminated on each side of a thicker and relatively stiff intermediate polymer layer provides for a laminate having surprisingly good bending stiffness in relation to its thickness. In addition, the arrangement of the two PECVD-deposited SiOx-layers has proved to result in a much more than two-fold increased gas barrier, compared to a laminate or film containing merely one SiOx-layer. Thus, the arrangement of an intermediate layer also acting as a "buffer" for penetration of gas, in particular oxygen gas, provides for surprisingly improved gas barrier properties, which indicates a synergistic effect resulting from this particular arrangement.

On the outside of the carrier layer 11, which will constitute the outside wall of a packaging container produced from the packaging laminate, is applied at least one layer 16 of a heat-sealable olefin polymer, preferably a low density polyethylene (LDPE) or a linear low density polyethylene (LLDPE), which include also so-called metallocene-catalysed LLDPE's (m-LLDPE), i.e. LLDPE polymers catalysed by means of a single site catalyst. Other examples of alternative polymers for the outside packaging wall layer may be medium high density polyethylene (MDPE) or polypropylene (PP).

On the outside of the carrier layer 13, which will constitute the inside wall of a packaging container produced from the packaging laminate, is applied at least one layer 17 of a heat-sealable olefin polymer, preferably a layer of LDPE, more preferably a layer of LLDPE and most preferably a first part-layer 17a of LDPE and a second outermost part-layer 17b of LLDPE.

The outside layers 16, 17 are applied each in a quantity of from about 10 to about 30 μm, for optimal heat sealability properties in relation to cost efficiency.

For optimal adhesion between the various layers of the packaging laminate, there are preferably used binder layers of adhesive polymers, tie layers and primers, known in the art. Such binder layers and primers are adapted to the specific choices of polymer in the various layers and may be selected from polyolefins and modified polyolefins, preferably polyethylene-based polymers, such as for example LDPE and modified LDPE.

Preferably, in the binder layers 18;19 between the layers of SiOx 13;14 and the intermediate polyolefin layer 15, there is used a polyethylene base polymer graft modified by an unsaturated alkoxysilane compound, such as described in U.S. Pat. No. 5,731,092, herein incorporated by reference. See especially column 1, line 39 to column 3, line 21 and Examples 1 and 2.

Other examples of binder layers are LPDE homo- or copolymers or graft copolymers of polyethylene, grafted with monomers comprising carboxylic or glycidyl functional groups, such as acrylic monomers or maleic anhydride (MAH) monomers, for example ethylene (meth)acrylic acid copolymer (E(M)AA), ethylene-glycidyl(meth)acrytate copolymer (EG(M)A)) or MAH-grafted polyethylene (MAH-g-PE).

Any of the above discussed polymers may also be used in optional binder layers 20;21 between the outer heat-sealable polyolefin layers 16;17 and the polymer carrier layers 11;12.

Figure 2:
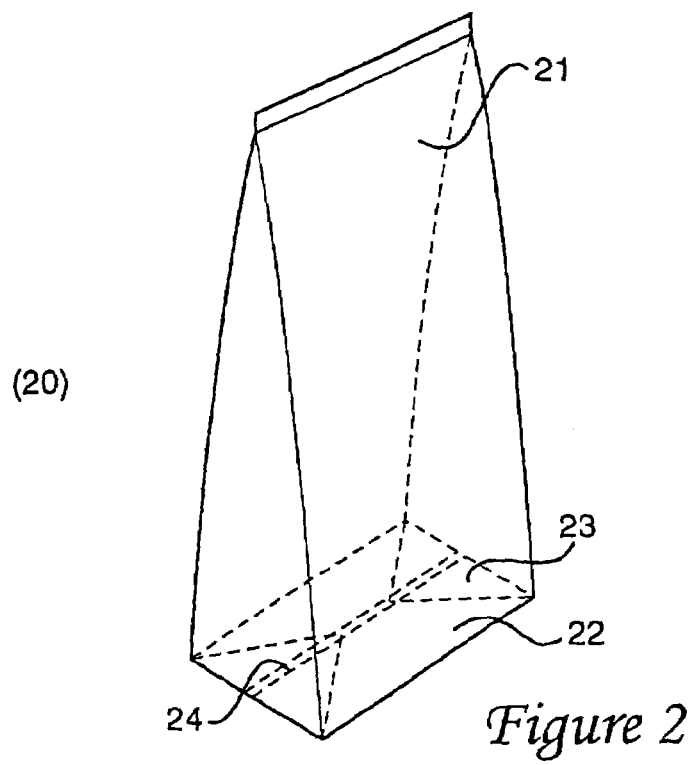
FIG. 2 shows a preferred example of a packaging container produced from the packaging laminate according to the invention and FIGS. 3a, 3b, and 3c show alternative preferred embodiments of methods of manufacturing of the packaging laminate.

FIG. 2 shows a preferred example of a packaging container 20 produced from the packaging laminate 10 according to the invention. The packaging container is particularly suitable for small beverage packages for direct use by means of a drinking straw or the like. Typically, such a package has a volume of about 330 ml or less, preferably from about 100 to about 250 ml, for example about 125 ml, 200 ml or about 250 ml. It may be a pouch of any configuration, but is preferably shaped as a wedge 21, such that it is easy to handle and dimensionally stable when put on a shelf in the food store or on a table or the like. In order to obtain such a "wedge-shape", the bottom part 22 of the package is fold formed such that the transversal heat seal 24 of the bottom is hidden under the triangular corner flaps 23, which are folded and sealed against the bottom of the package.

Figure 3A:
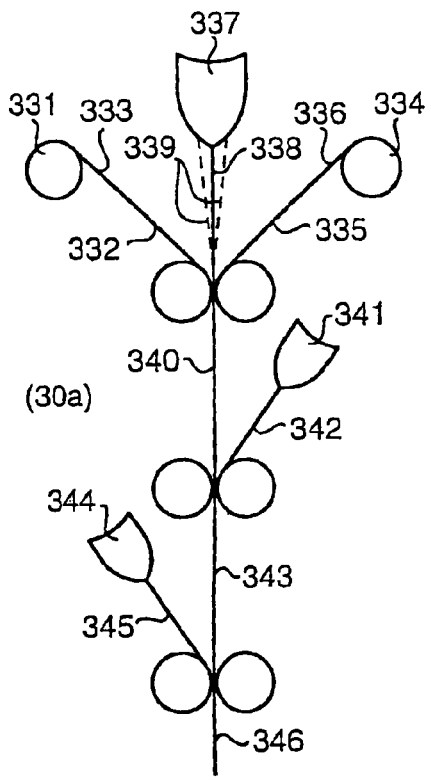

FIG. 3a shows a preferred embodiment 30a of a method of producing the packaging laminate 10 according to the invention.

A first web 331 of a polymer carrier layer 332 coated with a SiOx gas barrier layer 333, and a second web 334 of a polymer carrier layer 335 coated with a SiOx gas barrier layer 336, are advanced towards an extrusion station 337, the two SiOx layers 333 and 336 preferably facing each other, and laminated to each other by means of extruding an intermediate polymer layer 338 between them and pressing the two webs 331,334 and the intermediate layer 338 together when passing a roller nip after the extrusion station 337. The intermediate polymer layer 338 may be coextruded together with adjacent layers of binder polymer 339 for improved bonding to the SiOx-layers on the two webs 331 and 334. The resulting laminated web 340 is advanced to an extrusion station 341, where an outside layer of a heat-sealable polyolefin 342 is extruded onto the outside of the polymer carrier layer 335. The thus resulting web 343 is further advanced to an extrusion station 344, where an outside layer of a heat-sealable polyolefin 345 is extruded onto the outside of the polymer carrier layer 332.

The resulting packaging laminate 346 will then be wound up and stored onto a reel, not shown.

Figure 3B:
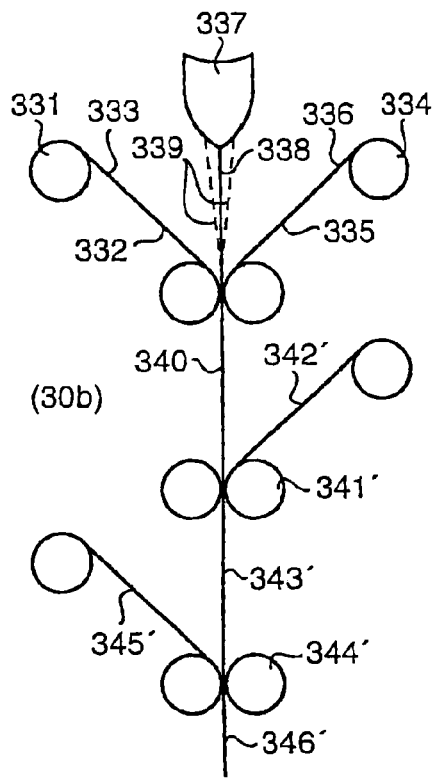

FIG. 3b shows another preferred embodiment 30b of a method of producing the packaging laminate 10 according to the invention.

A first web 331 of a polymer carrier layer 332 coated with a SiOx gas barrier layer 333, and a second web 334 of a polymer carrier layer 335 coated with a SiOx gas barrier layer 336, are advanced towards an extrusion station 337, the two SiOx layers 333 and 336 preferably facing each other, and laminated to each other by means of extruding an intermediate polymer layer 338 between them and pressing the two webs 331,334 and the intermediate layer 338 together when passing a roller nip after the extrusion station 337. The intermediate polymer layer 338 may be coextruded together with adjacent layers of binder polymer 339 for improved bonding to the SiOx layers on the two webs 331 and 334. The resulting laminated web 340 is advanced to a hot roller nip 341', where an outside layer of a pre-manufactured film comprising at least one layer of a heat-sealable polyolefin 342' is laminated to the outside of the polymer carrier layer 335, by means of application of heat and pressure in the hot roller nip 341'. The thus resulting web 343' is further advanced to a hot roller nip 344', where an outside layer of a premanufactured film comprising at least one layer of a heat-sealable polyolefin 345' is laminated to the outside of the polymer carrier layer 332, by application of heat and pressure in the hot roller nip 344'.

The resulting packaging laminate 346' will then be wound up and stored onto a reel, not shown.

Figure 3C:
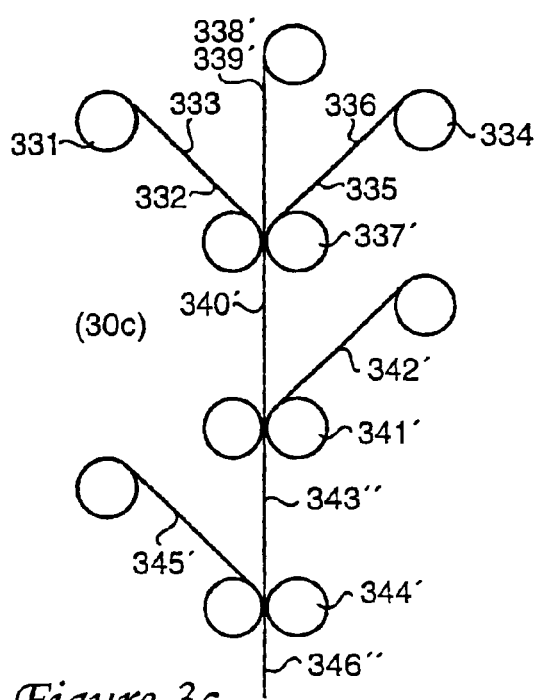

FIG. 3c shows a further preferred embodiment 30c of a method of producing the packaging laminate 10 according to the invention.

A first web 331 of a polymer carrier layer 332 coated with a SiOx gas barrier layer 333, and a second web 334 of a polymer carrier layer 335 coated with a SiOx gas barrier layer 336, are advanced towards a hot roller nip 337', the two SiOx layers 333 and 336 preferably facing each other, at the same time as a web of a pre-manufactured film of an intermediate polymer layer 338' is advanced between the two webs 331, 334 towards the nip 337'. The three webs are laminated to each other by application of heat and pressure when passing the hot roller nip 337'. The intermediate polymer layer 338' may be a premanufactured film having outer layers of binder polymer 339' for improved bonding to the SiOx-layers on the webs 331,334. The resulting laminated web 340' is advanced to a hot roller nip 341', where an outside layer of a pre-manufactured film comprising at least one layer of a heat-sealable polyolefin 342' is laminated to the outside of the polymer carrier layer 335, by means of application of heat and pressure in the hot roller nip 341'. The thus resulting web 343" is further advanced to a hot roller nip 344', where an outside layer of a pre-manufactured film comprising at least one layer of a heat-sealable polyolefin 345' is laminated to the outside of the polymer carrier layer 332, by application of heat and pressure in the hot roller nip 344'.

The resulting packaging laminate 346" will then be wound up and stored onto a reel, not shown.

In the method 30a above, the extrusion stations 341 and 344 may be passed in the opposite order according to an alternative preferred embodiment.

in each of the methods 30b and 30c above, the lamination of the outside heat-sealable polyolefin films may be carried out in the opposite order, i.e. by first laminating the pre-manufactured film 345' to the outer side of the polymer carrier layer 332, in the hot roller nip 344', thus resulting in a web 347. The web 347 is further advanced to a hot roller nip 341', in which the outside heat-sealable premanufactured film 342' is then laminated to the outer side of the polymer carrier layer 335, thus resulting in the packaging laminate 346' or 346".

Other combinations of hot-nip lamination and extrusion lamination are conceivable within the concept of the invention, as set out in the appended claims, although not represented by separate drawings. For example, a method wherein the intermediate polymer layer 338' is a pre-manufactured film to be hot-nip laminated as described in FIG. 3c, may be combined with extrusion lamination of one or both of the outer heat-sealable layers 342 and 345, such as described in connection with FIG. 3a.

According to other preferred embodiments of the methods 30a, 30b and 30c, the surface of the SiOx gas barrier layer 333, 336 is treated by a surface oxidation treatment such as corona treatment, in order to provide improved adhesion to the intermediate polymer layer 338, 338' or the binder layers 339, 339'.

According to an alternative embodiment of the method of manufacturing the packaging laminate of the invention, the various pre-manufactured webs 331, 334, 338', 342' and 345' are laminated to each other by means of primer lamination, i.e. by means of coating and drying a primer or anchoring agent onto one of the webs and then laminating through a roller nip.

The packaging laminate 10 may be provided with a printed decor layer in order to render the packaging container more attractive and informative to consumers and to protect its contents against light, which printed decor may be applied onto the SiOx layer 333 or 336, which is directed towards the outside of a package formed from the packaging laminate. Alternatively it may be applied onto the other side of the carrier layer 332 or onto the outside layer of heat-sealable polyolefin 342, 345; 342', 345'. In the latter case, the printed outside should preferably be covered by a thin, transparent protective polymer layer.

By way of conclusion it should be observed that the present invention which has been described above with particular reference to the accompanying figures, is not restricted to these embodiments described and shown exclusively by way of example, and that modifications and alterations obvious to a person skilled in the art are possible without departing from the inventive concept as disclosed in the appended claims.

What is claimed is:

1. Transparent gas barrier packaging laminate having a bending stiffness for packaging of liquid foods and drinks by a high speed, continuous process, comprising:
   first and second outside layers of heat-sealable olefin polymer; heat-sealable olefin polymer;
   a first gas barrier coated carrier layer including a first gas barrier layer consisting of plasma enhanced chemical vapour deposited SiOx coated onto a first polymer carrier layer, where x is from 1.7 to 2.0;
   a second gas barrier coated carrier layer including a second gas barrier layer consisting of plasma enhanced chemical vapour deposited SiOx, coated onto a second polymer carrier layer, where x is from 1.7 to 2.0; and
   an intermediate polymer layer laminated between the first and second gas barrier coated carrier layers, the intermediate polymer layer having a higher thickness relative to each of the first and second gas barrier coated carrier layers, and a higher stiffness relative to low density polyethylene,
   wherein a stiffness of each of the first and second polymer carrier layers interacts with the stiffness and the higher thickness of the intermediate polymer layer by an I-beam or sandwich effect to provide the bending stiffness,
   wherein a thickness of the intermediate polymer layer is from 40 to 60 µm, a thickness of each of the first polymer carrier layer and the second polymer carrier layer is from 8 to 15 µm, thicknesses of the first and second outside layers of heat-sealable olefin polymer are from 10 to 25 µm, and from 18 to 30 µm, respectively, and a total thickness of the packaging laminate is from 110 to 140 µm.

2. Transparent gas barrier packaging laminate according to claim 1, wherein the thickness of the intermediate polymer layer constitutes from 30 to 55% of a total thickness of the packaging laminate.

3. Transparent gas barrier packaging laminate according to claim 2, wherein the thickness of the intermediate polymer layer constitutes from 35 to 50% of the total thickness of the packaging laminate.

4. Transparent gas barrier packaging laminate according to claim 1, wherein the first or second polymer carrier layer is a film of oriented polyester or polyamide.

5. Transparent gas barrier packaging laminate according to claim 4, wherein the oriented polyester or polyamide is selected from mono- or biaxially oriented polyethyleneterephtalate (PET), mono- or biaxially oriented polyethylenenaphtenate (PEN) and mono- or biaxially oriented polyamide (PA).

6. Transparent gas barrier packaging laminate according to claim 1, wherein the intermediate polymer layer is a polymer selected from high density polyethylene or polypropylene.

7. Transparent gas barrier packaging laminate according to claim 1, wherein the intermediate polymer layer is an olefin polymer and the first and second polymer carrier layer is an oriented polyester or polyamide.

8. Transparent gas barrier packaging laminate according to claim 1, wherein the plasma enhanced chemical vapour-deposited SiOx gas barrier layers of the first and second gas barrier coated carrier layers are positioned in the laminate such that they are facing towards each other.

9. Transparent gas barrier packaging laminate according to claim 8, wherein the intermediate polymer layer is laminated to the layers of plasma enhanced chemical vapour-deposited SiOx by means of a binder layer.

10. Transparent gas barrier packaging laminate according to claim 9, wherein the binder layer comprises a graft copolymer of alkoxysilane and polyethylene.

11. Transparent gas barrier packaging laminate according to claim 1, wherein the plasma enhanced chemical vapor-deposited SiOx-layer has a thickness of 50 to 500 Å.

12. Transparent gas barrier packaging laminate according to claim 11, wherein the plasma enhanced chemical vapour-deposited SiOx-layer has a thickness is 80 to 300 Å.

13. Transparent gas barrier packaging laminate according to claim 1, wherein the first polymer carrier layer and the second polymer carrier layer have the same thickness.

14. Transparent gas barrier packaging laminate according to claim 1, wherein the thickness of the intermediate polymer layer is from 40 to 50 μm and the thickness of each of the first polymer carrier layer and the second polymer carrier layer is from 12 to 15 μm.

15. Transparent gas barrier packaging laminate according to claim 1, wherein the thickness of the intermediate polymer layer is from 50 to 60 μm and the thickness of each of the first polymer carrier layer and the second polymer carrier layer is from 8 to 12 μm.

16. Packaging container manufactured from a packaging material comprising a packaging laminate according to claim 1.

17. Transparent gas barrier packaging laminate according to claim 1, wherein the thickness of the intermediate polymer layer is from 40 to 55 μm.

* * * * *

UNITED STATES PATENT AND TRADEMARK OFFICE
CERTIFICATE OF CORRECTION

| | | |
|---|---|---|
| PATENT NO. | : 7,122,234 B2 | Page 1 of 1 |
| APPLICATION NO. | : 10/705876 | |
| DATED | : October 17, 2006 | |
| INVENTOR(S) | : Torsten Olofsson et al. | |

It is certified that error appears in the above-identified patent and that said Letters Patent is hereby corrected as shown below:

On the Title of the patent, please add the following:

Item (30)  Foreign Application Priority Date

Nov. 13, 2002  Sweden          0203350-4

Signed and Sealed this

Seventeenth Day of April, 2007

JON W. DUDAS
*Director of the United States Patent and Trademark Office*